United States Patent [19]

Freeman

[11] Patent Number: 5,199,754
[45] Date of Patent: Apr. 6, 1993

[54] SAFETY BARRIER FOR A SCHOOL BUS

[76] Inventor: Lowell J. D. Freeman, 26255 Highpass Rd., Junction City, Oreg. 97448

[21] Appl. No.: 848,745

[22] Filed: Mar. 10, 1992

[51] Int. Cl.$^5$ .............................................. B60R 21/14
[52] U.S. Cl. .................... 293/117; 116/28 R; 180/271; 340/433
[58] Field of Search .......... 293/117; 180/271; 116/28 R; 340/433; 296/1.10

[56] References Cited

U.S. PATENT DOCUMENTS

| 4,697,541 | 10/1987 | Wicker | 293/117 X |
| 4,956,630 | 9/1990 | Wicker | 116/28 R |
| 4,983,949 | 1/1991 | Wicker | 340/433 |

Primary Examiner—Robert R. Song
Attorney, Agent, or Firm—James D. Givnan, Jr.

[57] ABSTRACT

A motor driven barrier is disclosed for installation on the front end of a school bus. An elongate barrier member is carried in a stowed position adjacent the bus front bumper and upon deployment protrudes forwardly from the bus in approximate alignment with the right side of the vehicle. A motor housing includes brackets for bumper attachment. A reversible electric motor powers a driven shaft through 90° or so to position the barrier. A lost motion drive includes a spiral spring which yields in the event an obstruction is encountered by the arm. A second spiral spring cooperates with the first mentioned spring to locate the barrier in an operatively disposed position forward of the vehicle and permits momentary displacement of the barrier. A pair of switches serve to establish polarity reversing motor circuits with the switches in relay controlled circuits with a driver actuated vehicle door control switch. A barrier mounted light is in circuit with the vehicle's amber light system.

4 Claims, 1 Drawing Sheet

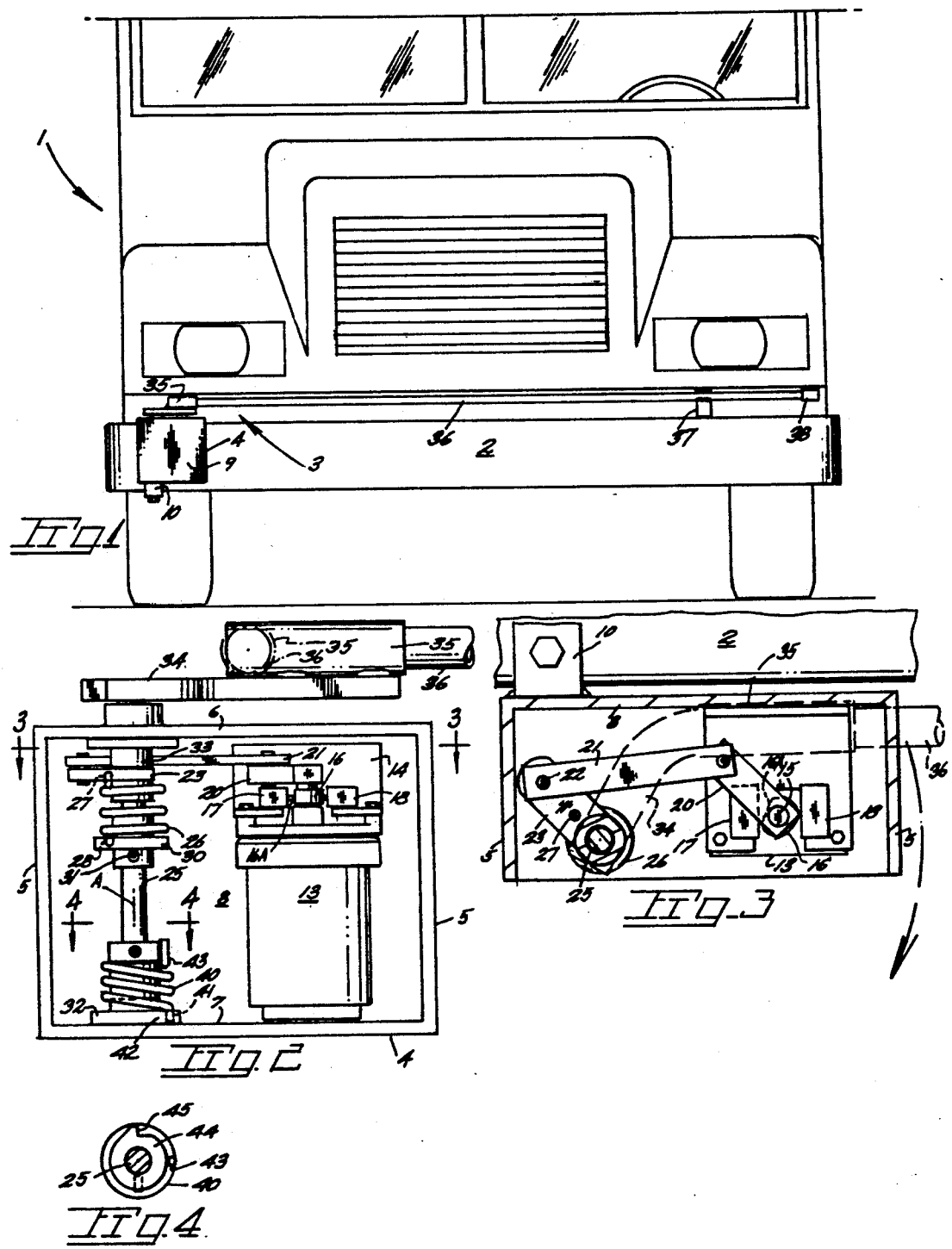

SAFETY BARRIER FOR A SCHOOL BUS

BACKGROUND AND SUMMARY OF THE INVENTION

The present invention pertains generally to a vehicle mounted safety device for preventing foot traffic immediately forward of a school bus in an area below the driver's field of vision.

A problem exists in that drivers of school buses have difficulty in seeing young children crossing closely in from of the bus. While children are instructed to cross several feet in front of the bus so as to be observed such instruction is not always observed. A young child immediately in front of the bus or a child who stoops to pick up a dropped article are below the driver's field of vision and such occurrences have resulted in serious injury and death.

The present invention is embodied within a driven barrier located at the front of a school bus for automatic deployment to extend several feet forward of the bus to require children to cross at a distance forward of the bus in an area readily visible to the driver.

The present invention includes an elongate arm or barrier which is normally stowed transversely at the bus front end and which is automatically swung to an operable position forward of the bus to provide a barrier immediately forward of the school bus. The arm is actuated by a drive mechanism and may yield upon contact with a person or obstruction. Inadvertent contact with the arm results in the arm yielding momentarily and subsequently returning to the desired, deployed position projecting forwardly from the bus.

Important objectives of the present invention include the provision of a positionable barrier for installation on a vehicle to prevent people alighting from the vehicle from crossing immediately in front of the vehicle; the provision of a safety barrier for installation on a school bus with but little or no modification of the latter; the provision of a safety barrier including a reversible electric motor and switch means compatible with existing circuitry of the vehicle to facilitate both convenient installation and use of the present device; the provision of a safety barrier for a vehicle having an arm component positioned by drive means with spring components to prevent injury or damage upon accidental contact of the arm with a person or object and to return the arm or barrier to a deployed position.

BRIEF DESCRIPTION OF THE DRAWINGS

In the accompanying drawings:

FIG. 1 is a front elevational view of a school bus equipped with the present safety barrier;

FIG. 2 is a front elevational view of the present safety barrier with parts broken away for purposes of illustration;

FIG. 3 is a horizontal sectional view taken downwardly along line 3—3 of FIG. 2; and, FIG. 4 is a horizontal sectional view taken downwardly along line 4—4 of FIG. 2.

DETAILED DESCRIPTION OF THE PREFERRED EMBODIMENTS

With continuing attention to the drawings wherein applied reference numerals indicate parts similarly hereinafter identified, the reference numeral 1 indicates generally a vehicle shown as a school bus.

A front bumper 2 of the school bus serves to mount the present safety barrier indicated generally at 3. A base 4 of the barrier assembly is shown in the form of a housing having side walls 5, top and bottom walls 6 and 7 and a rear wall 8. A front wall 9 is a closure to permit access to later described components. For securement of base 4 to vehicle 1 brackets as at 10 in place on base rear wall 8 serve to receive fasteners engageable with the upper and lower flanges of vehicle bumper 2.

A reversible electric motor at 13 is retained in place within base 4 by a bracket 14. Motor 13 is of the gear head type having an output shaft at 15 provided with a cam wheel 16. Miniature snap action switches at 17 and 18 on bracket 14 each have pins in riding contact with cam wheel 16. The operation of switches 17 and 18 is discussed below. Cam wheel 16 has a flat 16A.

Drive means driven by motor output shaft 15 includes a drive arm 20 to which a link 21 is pivotally coupled. Link 21 terminates in pivoted connection at 22 with a driven arm 23. Driven arm 23 is carried by and wingable about a pivot shaft 25 having an upright axis A. Driven arm 23 imparts arcuate movement to shaft 25 through a spiral spring 26 which has an upturned end 27 seated within an aperture in driven arm 23 while oppositely a downturned spring end 28 is seated within a flange 30 pinned at 31 to the shaft. The lower end of pivot shaft 25 is journalled within a bearing plate 32 while the upper end of shaft 25 is journalled within a sleeve 33. Shaft 25 extends upwardly from the housing to receive a barrier support 34. From the foregoing it will be seen that motor operation in one direction will impart arcuate motion to shaft 25 via spiral spring 26 in a lost motion or yieldable manner as spring 26 may wind and unwind to some extent depending on the load incurred in rotating pivot shaft 25.

With attention again to barrier support 34 the same is provided with a socket 35 in which is carried one end of an elongate arm or barrier 36 which is preferably of tubular fiberglass construction. A bracket is provided at 37 in place on bus bumper 2 and supports the barrier end when fully retracted into a stowed position above the bumper. A light at 38 is carried at the arm end.

With attention again to the drive means, provision is made of a yieldable limit stop for barrier 36 with the limit stop including spiral spring return element at 40 having an end 41 anchored in place at 42 while the remaining spring end at 43 projects axially into the path of a shaft carried ring 44 having an abutment 45 thereon engageable with spring end 43. The springs 26 and 40 are of like rates to permit the springs to be in equilibrium when the barrier 36 has been driven through approximately 90° from its transverse, stowed position to a forwardly projecting, operable position. Forces imparted oppositely to the forwardly deployed elongate barrier result in winding and unwinding of the springs to some extent which permits movement and return of the barrier to the predetermined deployed position. Should the arm become obstructed during motor driven travel, the drive means may continue to function with spiral spring 26 serving as a lost motion connection between the linkage and the barrier pivot shaft 25.

Operation of the barrier is initiated by the driver actuating a door switch at the driver's station. The motor 13 is in circuit with the switch via a relay to establish a circuit including motor mounted switch 18. Subsequent motor operation will swing barrier 36 to a position projecting forwardly from the right hand side of the vehicle. Children who must cross in front of the stopped bus will have to walk parallel to the barrier for several feet before turning to cross in front of the vehicle. Motor operation to deploy the barrier is stopped by rotation of cam wheel 16 through ninety degrees. The flat on the cam wheel at such time permits switch 18 to open. Driver reactuation of the door control switch will establish a polarity reversing motor circuit through motor mounted switch 17 for swinging the barrier back to its stowed position to engage bumper mounted bracket 37. Light 38 on the barrier is in circuit with the bus red flashing warning lights.

When deployed, barrier 36 maybe momentarily displaced by a person accidentally contacting same but will return to the deployed position in approximate alignment with the right side of the bus by reason of the opposed spiral springs 26 and 40 being in equilibrium when the barrier is so positioned.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

1. A motor driven barrier assembly for attachment to a vehicle, said assembly comprising,
   a base including a housing with means for attaching said base to said vehicle,
   a reversible electric motor on said base,
   switch means in circuit with said motor and an electrical source and operable to control motor operation,
   an elongate barrier having a retracted position disposed transversely of the vehicle centerline and positionable to a deployed position projecting forwardly from the vehicle to prevent foot traffic crossing a street immediately forward of the vehicle, said barrier substantially coextensive with a vehicle bumper when in its retracted position,
   pivot means swingable mounting said barrier on said base and
   drive means coupling said motor to said pivot means to drive the barrier through an arc of approximately ninety degrees, spring means constituting a lost motion connection between said motor and said pivot means.

2. A barrier assembly for attachment to a vehicle to direct people alighting from the vehicle, said barrier assembly comprising,
   a base,
   a reversible electric motor on said base,
   means for mounting said base to the vehicle,
   switch means in circuit with a source and said motor to control motor direction and duration of operation,
   a barrier positionable by the motor from a retracted position proximate the vehicle to a deployed position projecting forwardly from the vehicle to prevent people from crossing a roadway immediately forward of the vehicle,
   pivot means on said base and supporting said barrier for travel in an arcuate path, and
   drive means coupling said motor to said pivot means to move said barrier along said arcuate path, said drive means including a spiral spring drive element to drive the barrier in a yieldable manner.

3. The motor drive barrier assembly claimed in claim 1 additionally including a spiral spring return element biasing said pivot means in a direction opposite to the action of said spring means to return said elongate barrier to a predetermined position after momentary displacement therefrom by the foot traffic.

4. The motor driven barrier assembly claimed in claim 2 additionally including a spring return element biasing said pivot means in a direction opposite to the action of said spiral spring drive element to return said elongate barrier to the deployed position after momentary displacement therefrom by a person.

* * * * *